United States Patent
Heinrici et al.

(10) Patent No.: US 10,092,981 B2
(45) Date of Patent: Oct. 9, 2018

(54) CROSSJET ASSEMBLY AND METHOD FOR CARRYING AWAY CONTAMINANTS

(71) Applicant: REIS GROUP HOLDING GMBH & CO. KG, Obernburg (DE)

(72) Inventors: Axel Heinrici, Aachen (DE); Armin Tesmer, Herzogenrath (DE)

(73) Assignee: KUKA DEUTSCHLAND GMBH, Augsburg (DE)

( * ) Notice: Subject to any disclaimer, the term of this patent is extended or adjusted under 35 U.S.C. 154(b) by 112 days.

(21) Appl. No.: 14/892,381

(22) PCT Filed: May 28, 2014

(86) PCT No.: PCT/EP2014/061075
§ 371 (c)(1),
(2) Date: Nov. 19, 2015

(87) PCT Pub. No.: WO2014/191463
PCT Pub. Date: Dec. 4, 2014

(65) Prior Publication Data
US 2016/0184927 A1    Jun. 30, 2016

(30) Foreign Application Priority Data

May 29, 2013    (DE) .................... 20 2013 102 339 U

(51) Int. Cl.
B23K 26/00    (2014.01)
B23K 26/142    (2014.01)
(Continued)

(52) U.S. Cl.
CPC .......... B23K 26/142 (2015.10); B08B 15/007 (2013.01); B23K 26/14 (2013.01);
(Continued)

(58) Field of Classification Search
CPC ...... B23K 26/142; B23K 26/20; B23K 26/21; B23K 26/702; B23K 26/14; B23K 26/1476; B08B 15/007
(Continued)

(56) References Cited

U.S. PATENT DOCUMENTS 4,382,170 A * 5/1983 Klingel .................. B23K 10/00
219/121.48
4,588,872 A * 5/1986 Bollinger ............... B23K 7/102
219/124.34
(Continued)

FOREIGN PATENT DOCUMENTS

CN    2774694 Y    4/2006
CN    101003108 A    7/2007
(Continued)

OTHER PUBLICATIONS

International Search Report dated Oct. 10, 2014, corresponding to International Application No. PCT/EP2014/061075.
(Continued)

*Primary Examiner* — Mark Paschall
(74) *Attorney, Agent, or Firm* — Ladas & Parry LLP; Malcolm J. MacDonald

(57) ABSTRACT

The invention relates to a crossjet assembly for generating a gas flow that is conducted between a laser source (40, 41) and a welding region (42) in order to remove contaminants moving towards the laser source. The gas flow crosses the region between the laser source and the welding site numerous times.

15 Claims, 3 Drawing Sheets

(51) Int. Cl.
*B08B 15/00* (2006.01)
*B23K 26/14* (2014.01)
*B23K 26/70* (2014.01)
*B23K 26/21* (2014.01)

(52) U.S. Cl.
CPC .......... *B23K 26/1476* (2013.01); *B23K 26/21* (2015.10); *B23K 26/702* (2015.10)

(58) Field of Classification Search
USPC .............. 219/121.84, 121.78, 121.63, 137.2, 219/121.85, 137.41
See application file for complete search history.

(56) References Cited

U.S. PATENT DOCUMENTS

| | | | |
|---|---|---|---|
| 6,761,776 B2* | 7/2004 | Bowlin | B23K 9/324 |
| | | | 148/196 |
| 2004/0026388 A1 | 2/2004 | Staufer et al. | |
| 2009/0107966 A1 | 4/2009 | Wojcik et al. | |
| 2010/0072180 A1* | 3/2010 | Schuermann | G02B 6/4296 |
| | | | 219/121.67 |
| 2013/0087538 A1* | 4/2013 | Walter | B23K 26/24 |
| | | | 219/121.62 |
| 2013/0161299 A1* | 6/2013 | Herrn | B23K 26/064 |
| | | | 219/121.63 |
| 2015/0308459 A1* | 10/2015 | Lardy | F04D 17/122 |
| | | | 415/1 |

FOREIGN PATENT DOCUMENTS

| | | |
|---|---|---|
| CN | 202278309 U | 6/2012 |
| DE | 20318461 U1 | 3/2004 |
| EP | 1016494 A2 | 7/2000 |
| EP | 1607167 A1 | 12/2005 |
| JP | 11-314190 A | 11/1999 |
| JP | 2000-176672 A | 6/2000 |
| JP | 2010-142827 A | 7/2010 |

OTHER PUBLICATIONS

Non-English Office Action dated Sep. 23, 2016 for Chinese Application No. 201480030717.9 with English translation.
Espacenet English abstract of JP 2000-176672 A.
Espacenet English abstract of CN 2774694 Y.
Espacenet English abstract of CN 101003108 A.
Espacenet English abstract of JP 11-314190 A.
Espacenet English abstract of CN 202278309 U.
Espacenet English abstract of JP 2010-142827 A.

* cited by examiner

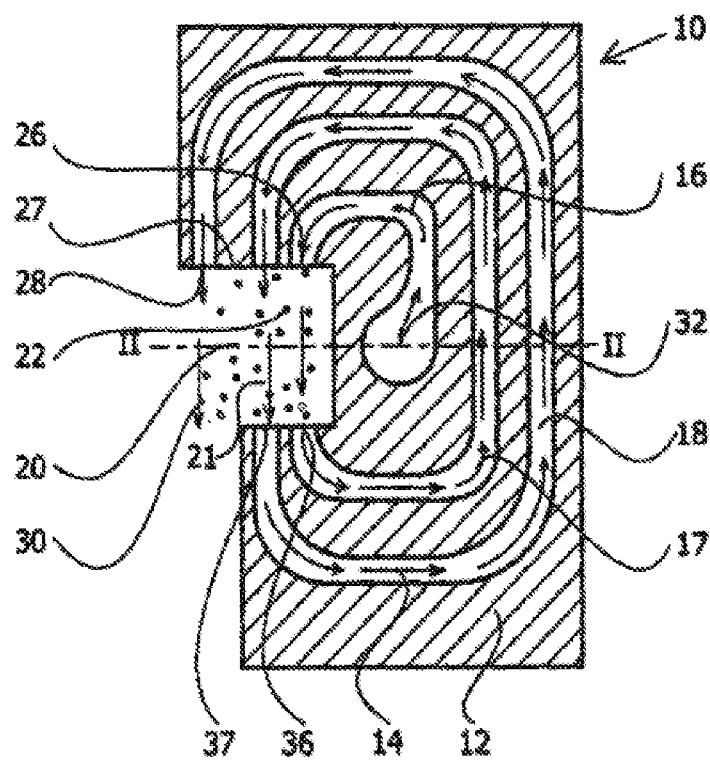
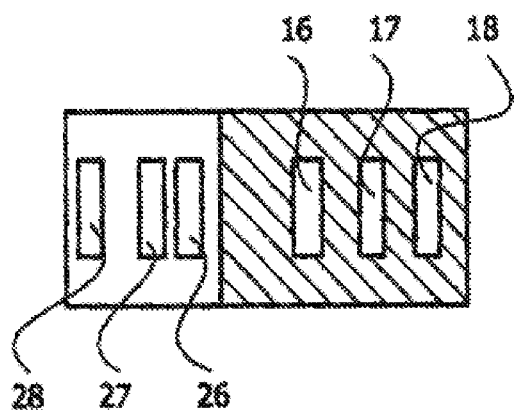
Fig. 1
Fig. 2
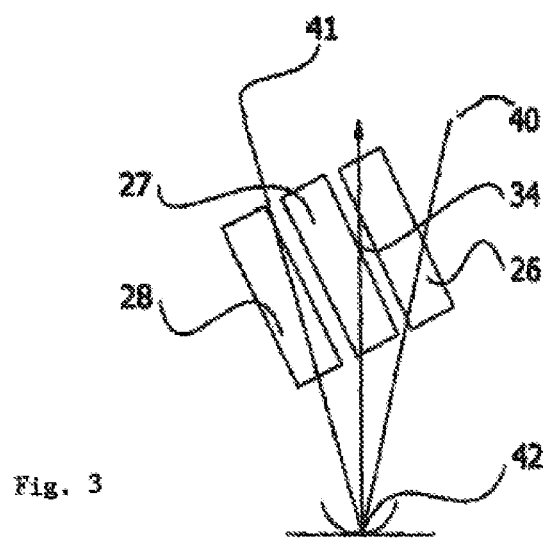
Fig. 3

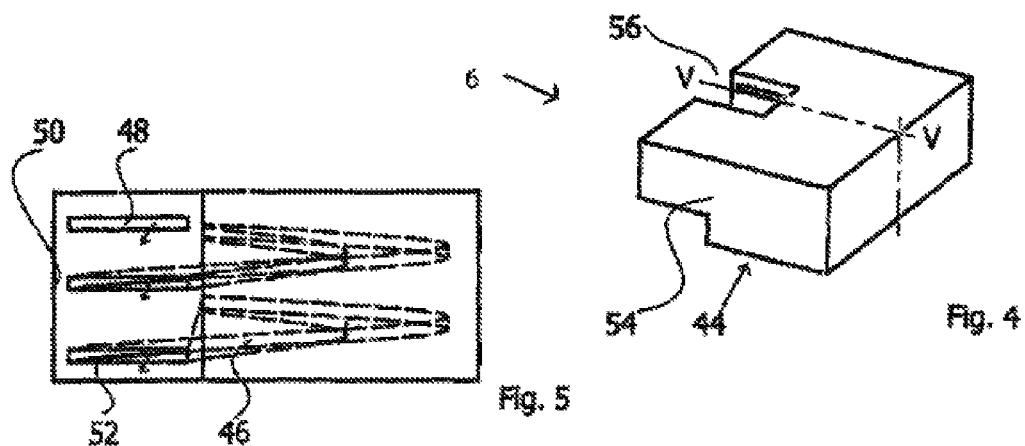
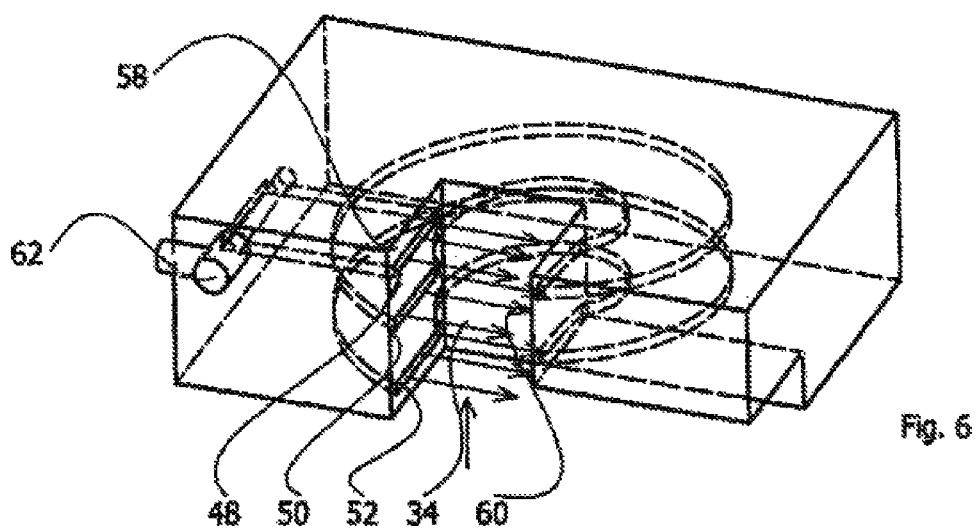
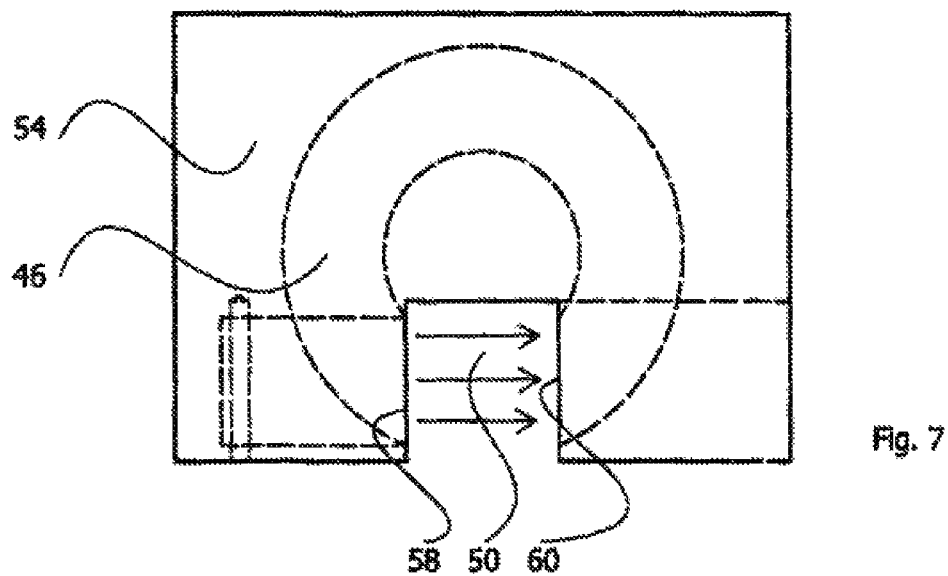

CROSSJET ASSEMBLY AND METHOD FOR CARRYING AWAY CONTAMINANTS

This application is a 371 of PCT/EP2014/061075, filed on May 28, 2014, which claims priority to German Application No. 202013102339.6, filed May 29, 2013.

The invention relates to a crossjet assembly for generating a gas flow between a working device such as a laser and a working area such as a welding area and conducted through a removal area for removing contaminations such as particles or vapors produced in the working area and moving in the direction of the working device. The invention also relates to a method for removing contaminations moving from a working site in the direction of a working device by a gas flow.

Chips, spatter, or smoke, gases or plasma emissions accumulate in various manufacturing processes such as drilling, polishing, turning, milling, welding or cutting different materials which lead to contaminations of the working device and which therefore influence their function. In order to avoid or at least attenuate contaminations from working devices such as lasers it is known that a gas flow can be used between the working area and the working device, i.e., their especially sensitive areas such as discharge windows for laser radiation during laser cutting or laser welding. A gas flow is purposefully generated in this case transversely to the main direction of flight of the contaminations in a so-called crossjet arrangement in order to entrain the contaminants and therefore prevent a contamination of the working device at least to a large extent.

The contamination mechanism consists of a transport of material from the working process to the working device. The gas flow or crossjet should catch and deflect the contaminants on their path to the working device so that they can no longer reach the working device or at least the areas that are especially to be protected.

In particular during deep laser welding small metallic spheres or liquid metallic drops can move at a high speed from the process in the direction of the laser discharge window.

In this case the gas flow must be expanded so far that the entire, especially sensitive area of the working device is protected. Furthermore, the speed of the gas flow must be so great that a sufficient deflection of the small metallic spheres or drops is achieved. The maximally available amount of gas is limited during use by the existing cross sections of the line and the existing air pressure. The same applies to the rate of flow. Therefore, in practice no complete protection of the working device can frequently be achieved so that the working device becomes contaminated. Therefore, it is necessary that the appropriate structural parts are cleaned or replaced after a given number of usage.

EP-1 607 167 A1 teaches a crossjet device for a laser hybrid welding process. A housing comprises an opening through which the laser radiation passes. A crossjet radiation is generated transversely to the latter, whereby the exit opening of the radiation has a smaller diameter than the entrance opening.

A Laval nozzle for a crossjet device is known from DE 203 18 461 U1.

The present invention has the basic problem of further developing a crossjet arrangement and a method of the initially cited type in such a manner that a gas flow is generated with simple constructive measures with which contaminations can be detected and deflected to a sufficient extent in such a manner that a working device is protected from contaminations.

In order to solve the problem the invention substantially provides that the gas flow is multiply conducted via a deflection device through the removal area.

Based on the teaching of the invention, the gas flow used to detect the contamination is multiply conducted through the removal area so that the gas pressure and the gas amount can correspond to those used in known arrangements but at the same time a higher degree of deflection and with it a protection for the working device take place. According to the invention the gas flow and the air flow are deflected in such a manner that the contaminants are multiply caught and/or influenced on their path to the working device, which achieves a distinct improvement of the protective effect or in the case of an arrangement used in comparison to the prior art a lesser consumption of gas is required in order to achieve the same protective effect.

In other words, the gas flow multiply crosses the path between the working area such as a welding area and the working device such as a laser source.

In particular, it is provided that the deflection device comprises a track that guides the gas flow in a helical manner and comprises several windings, wherein the windings are interrupted in the removal area.

The windings can open a plane running in particular at an incline to the direction of movement of the contamination.

However, there is the possibility of constructing the helically running track in three dimensions.

In a three-dimensional, helically running track the exit and entrances openings are arranged in a superposed manner in the direction of movement of the contaminations.

In order to deflect the gas flow so that it multiply passes through the removal area, another suggestion of the invention provides that the deflection devices comprises deflections acting in a meandering manner or conduits running in a meandering manner that are interrupted in the removal area.

In particular, it is provided that the deflection device is constructed in a preferably parallelepipedal housing that comprises a section limiting the removal area.

It is preferably provided that the section comprises two delimitations running parallel to one another through which the entrance and exit openings of the windings of the helically running track and/or the meandering conduits run and in which recesses with a section with the shape of a circular section are constructed as the deflections acting in a meandering manner.

A method for removing contaminations moving from a working site in the direction of a working device by a gas flow is distinguished in that the gas flow is defected so that it multiply passes through the direction.

In particular, it is provided that the gas flow is deflected by sections of a helically running track or by guides constructed in a meandering manner.

Other details, advantages and features of the invention result not only from the claims, the features to be gathered from them—alone and/or in combination—, but also from the following description of preferred exemplary embodiments to be gathered from the drawings.

In the drawings:

FIG. 1 shows a first embodiment of a crossjet arrangement,

FIG. 2 shows a section along the line II-II in FIG. 1,

FIG. 3 shows a section of the arrangement according to FIG. 1,

FIG. 4 shows a second embodiment of a crossjet arrangement,

FIG. 5 shows a section along the line V-V in FIG. 4,

FIG. 6 shows a view of the arrangement according to FIG. 4 in the direction of arrow 6, FIG. 7 shows a top view onto the arrangement according to FIG. 4.

Figure 8:
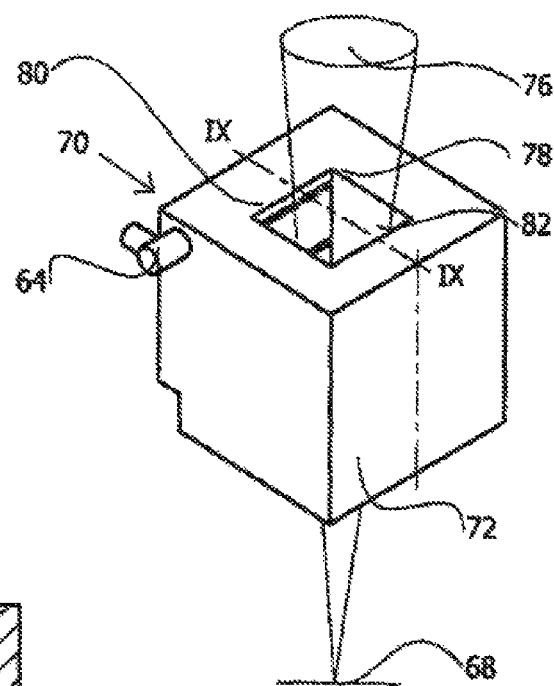
FIG. 8 shows a third embodiment of a crossjet arrangement.

The figures show purely schematically different embodiments of crossjet arrangements with which a gas flow such as an air flow is conducted in such a manner that the contaminations such as dirt particles moving from a working area in the direction of a working device are purposefully removed in order to protect the working device. The latter can be a laser device such as a laser welding device with which workpieces are welded in the work area, that is, in the welding area without this limiting the teaching of the invention.

In order to protect contaminations—called simply dirt particles in the following—from reaching the working device, such as the exit window of a laser, the using of crossjet arrangements is known, wherein an air flow flows transversally to the direction of flight or main direction of flight of the dirt particles between the working site and the working device, in order to deflect the dirt particles and therefore prevent them from striking the working device and its areas to be protected.

The invention provides that an appropriate gas flow—called an air flow in the following—is multiply deflected in the area of the dirt particles moving in the direction of the working device so that as a consequence the dirt particles are multiply exposed to the air flow with the consequence that a deflection of the dirt particles and therefore a protection of the working device is largely ensured.

In order to achieve a multiple deflection of the air flow in this regard, the invention provides several exemplary possibilities. Therefore, a helically running conduit 14 is constructed in the crossjet arrangement 10 according to the FIGS. 1 to 3 in a housing 12 which conduit comprises several windings 16, 17, 18 which are interrupted in an area 20 designated as the removal area and through which the laser radiation passes in the exemplary embodiment. In FIG. 1 the laser radiation runs into the plane of the drawing. Consequently, contaminations drawn away from the working area have a direction of flight that exits out of the plane of the drawing. The corresponding dirt particles are characterized by way of example as open circles and provided with the reference numeral 22.

The windings 16, 17, 18 are interrupted in the removal area 20, wherein the exit openings 26, 27 of the windings 16, 17 are directed toward entrance openings 36, 37 that run opposite the entrance openings 26, 27 as is also shown in the sectional view of FIG. 1. The air flow leaving the exit opening 28 of the winding 18 is then conducted laterally past the housing 12, as the arrow 30 illustrates. Moreover, it can be recognized that an air pressure source is connected to the beginning of the winding 16. The area forms the air supply 32.

In order that the dirt particles 22 are always caught by an air flow exiting from the exit openings 26, 27, 28, the windings 16, 17, 18 running in a plane run inclined relative to the main flight direction 34 of the dirt particles (FIG. 3). The air exiting from the exit openings 26, 27, 28 therefore catches dirt particles independently of the flight track since a complete covering of the flight directions of the dirt particles takes place by the inclination of the exit openings 26, 27, 28, which are rectangular in the exemplary embodiment.

Furthermore, FIG. 3 shows that the crossjet arrangement 10 with the air exiting via the exit openings 26, 27, 28 runs between a working device such as a laser source 40 and a process site 42 (working area).

The exemplary embodiment of FIGS. 4 to 7 shows a crossjet arrangement 44 in which a helically running conduit 46 is also constructed. The helical conduit 46 runs in three dimensions so that the exit openings 48, 50, 52 are arranged superposed relative to the main flight direction of the contaminations.

It can be recognized from the views of FIGS. 4, 6 and 7 that the crossjet arrangement 44 comprises a housing 54 with a section 56 that forms the removal area. The exit openings 48, 50, 52 of the helical conduit 46 run in a delimitation wall 58 of the section 56. Corresponding entrance openings are provided in an opposite wall 60 running parallel to the wall 58, wherein an entrance opening provided in the wall 60 and merging into the helically running conduit 46 is associated with the exit opening 48 and 50 in correspondence with the exemplary embodiment of FIGS. 1 to 3. The air exiting from the exit opening 52 then flows into the open air. Furthermore, an air connection 62 is sketched in FIG. 6 via which air is supplied to the helically running conduit 46.

For the rest, all figures are self-explanatory and clearly illustrate the features in accordance with the invention.

Figure 9:
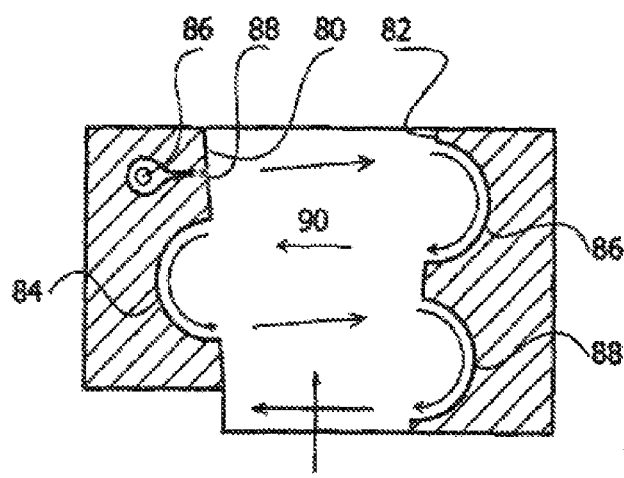
FIG. 9 shows a section along the line IX-IX in FIG. 8.
Figure 10:
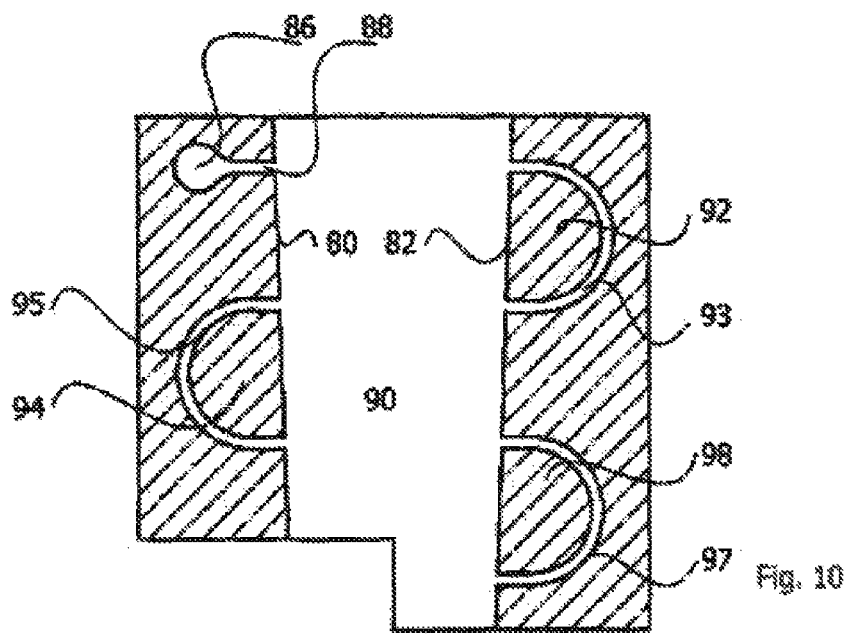
FIG. 10 shows a variant of the arrangement according to FIG. 8.

According to the exemplary embodiment of FIGS. 8 to 10 a meandering deflection of an air flow takes place in order to keep away particles from a working device such as laser source 76 which were ejected from a working site such as welding site 68. To this end a crossjet arrangement 70 with a housing 72 forming a third embodiment is arranged between the working site 68 and the laser source 76, which housing has a through opening 78 that is rectangular in section and through which the laser radiation and therefore also the dirt particles pass. Opposite walls 80, 82 of the opening 78 have indentations or recesses 84, 86, 88 with a circular section so that air supplied via an air connection 86 to a conduit and exiting from the latter is deflected via the indentations 84, 86, 88 with the consequence that the air flowing between the walls 80, 82 limiting a removal area 90 can deflect dirt particles entering in the removal area 90 and therefore remove them.

If according to the exemplary embodiment of FIG. 9 the recesses 84, 86, 88 are open on the removal side, there is the possibility according to the exemplary embodiment of FIG. 10 that a guide, that is, conduit sections for the air flowing through the removal area 90 is achieved, which guide runs in a meandering manner through inserts or slots 92, 94, 96.

Based on the teaching in accordance with the invention the contaminations are multiply exposed to the air flow on their way to a working device such as a laser and an interaction between the air flow and the contaminants takes place over a relatively long path by the oblique position of the crossjet arrangement 10 according to FIGS. 1 to 3.

As a result of these measures a distinctly stronger deflection of the contaminations takes place and if a deflection in accordance with the prior art is desired a lower consumption of air is needed. An increased deflection can be achieved in comparison to the prior art with a reduced consumption of air. If the contaminations multiply pass through the air flow in accordance with the exemplary embodiments of FIGS. 4 to 10 a distinctly stronger deflection of the contaminations also selectively results or a distinctly lesser gas consumption or in the case of an increased deflection an air consumption that is reduced in comparison to the prior art.

As regards the meandering arrangement according to the FIGS. 8 to 10, it is immaterial if the exit openings from the walls 80, 82 are opposed since a reduction of the flight speed component of the contaminations in the direction of the processing device takes place upon each crossing of the air flow by the air friction.

The meandering arrangement has the advantage in comparison to the helical arrangement of FIGS. 1 to 7 that the air flow has to be guided on a distinctly shorter length in the housing. This also results in the advantage that the arrangement 70 can be constructed with less weight given a suitable design. The number of defections and of the speed loss condition by the deflection is lower.

The invention claimed is:

1. A device for removing contaminants in a work zone, the device comprising:
   a housing;
   a cutout portion in the housing that defines a contaminant removal area;
   a helically running conduit having windings disposed in the housing, a first end configured to receive a flow of air, and a second end located proximate to the contaminant removal area;
   wherein the windings are interrupted in the contaminant removal area;
   wherein interrupted portions of the windings in the contaminant removal area are associated with opposing exit and entrance openings of the conduit;
   wherein the contaminant removal area receives multiple passes of the flow of air, such that contaminants travelling from a working area in the work zone to a working device in the work zone are exposed multiple times to the same flow of air; and
   wherein the second end of the conduit is disposed in a portion of the housing that extends beyond the pairs of opposing exit and entrance openings, such that the flow of air leaving the second end is conducted laterally past, and away from, the contaminant removal area.

2. The device according to claim 1, wherein the windings are disposed in a plane that is inclined relative to a direction of movement of the contaminants.

3. The device according to claim 1, wherein the conduit is a three-dimensional conduit.

4. The device according to claim 1, wherein the exit and entrance openings are superimposed over each other in a direction of movement of the contaminants.

5. The device according to claim 1, wherein the housing has a parallelepipedal shape.

6. A device for removing contaminants in a work zone, the device comprising:
   a housing having a rectangular through-opening with opposing walls;
   a conduit disposed in the housing, and configured to receive a flow of air;
   a cutout portion in the housing that defines a contaminant removal area; and
   a plurality of recesses disposed in the opposing walls of the through-opening;
   wherein the contaminant removal area receives multiple passes of the flow of air, such that contaminants travelling from a working area in the work zone to a working device in the work zone are exposed multiple times to the same flow of air.

7. The device according to claim 6, wherein the recesses have a circular cross-section.

8. The device according to claim 6, further comprising inserts disposed in the recesses so as to define conduits in opposing walls of the through-opening; and
   wherein the conduits are arranged so that a guide for the flow of air runs in a meandering orientation along a length of the through-opening.

9. The device according to claims 1, 6, or 8, wherein the contaminants are particles or vapors.

10. The device according to claims 1, 6, or 8, wherein the work zone comprises a working device and a working area.

11. The device according to claim 10, wherein the working area is a welding area, and the working device is a laser.

12. A method of removing contaminants in a work zone, the method comprising:
   arranging the device according to claims 1, 6, or 8 between a working area and a working device in the work zone;
   providing the flow of air to the conduit; and
   directing multiple passes of the flow of air across the contaminant removal area to move the contaminants laterally past, and away from, the contaminant removal area.

13. The method according to claim 12, wherein the working area is a welding area, and the working device is a laser.

14. The method according to claim 12, wherein the contaminants are particles or vapors.

15. The method according to claim 12, wherein contaminants travelling from the working area to the working device are exposed multiple times to the same flow of air.

* * * * *